(12) United States Patent
Buckley et al.

(10) Patent No.: US 7,615,751 B2
(45) Date of Patent: Nov. 10, 2009

(54) ADJUSTABLE MOTION DETECTION SENSOR WITH CAM

(75) Inventors: Mark C. Buckley, Pollock Pines, CA (US); Bruce Ginn, Grass Valley, CA (US); Raymond E. Daggers, Orangevale, CA (US); Rand Lenroot, Folsom, CA (US); Roy Phi, Elk Grove, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/123,789

(22) Filed: May 20, 2008

(65) Prior Publication Data

US 2009/0166538 A1    Jul. 2, 2009

Related U.S. Application Data

(63) Continuation-in-part of application No. 11/965,054, filed on Dec. 27, 2007, now abandoned.

(51) Int. Cl.
   *G01J 5/02*    (2006.01)
(52) U.S. Cl. .................. 250/347; 250/353; 250/339.14
(58) Field of Classification Search ................. 250/340, 250/339.14, 347, 353
   See application file for complete search history.

(56) References Cited

U.S. PATENT DOCUMENTS

| 5,381,009 A | 1/1995 | Brownell |
| 6,082,894 A * | 7/2000 | Batko et al. ................. 374/142 |
| 6,175,309 B1 | 1/2001 | Drake et al. |
| 2007/0288108 A1 | 12/2007 | Parker et al. |

FOREIGN PATENT DOCUMENTS

DE    4426919 A1 *  2/1996

* cited by examiner

*Primary Examiner*—David P Porta
*Assistant Examiner*—Marcus H Taningco
(74) *Attorney, Agent, or Firm*—Husch Blackwell Sanders Welsh & Katz

(57) ABSTRACT

This invention relates generally to the field of motion detection sensors, and in particular to a system and method for adjusting the position of a printed circuit board relative to a focusing element. The invention includes a housing having a front opening and an interior cavity. A focusing element is located within the front opening and the detector is coupled to a printed circuit board located within the interior cavity. A cover is coupled to the printed circuit board and disposed within the interior cavity. A cam is operatively coupled with the cover and the printed circuit board for adjusting the position of the printed circuit board such that the detector's position is adjusted relative to the focusing element.

20 Claims, 3 Drawing Sheets

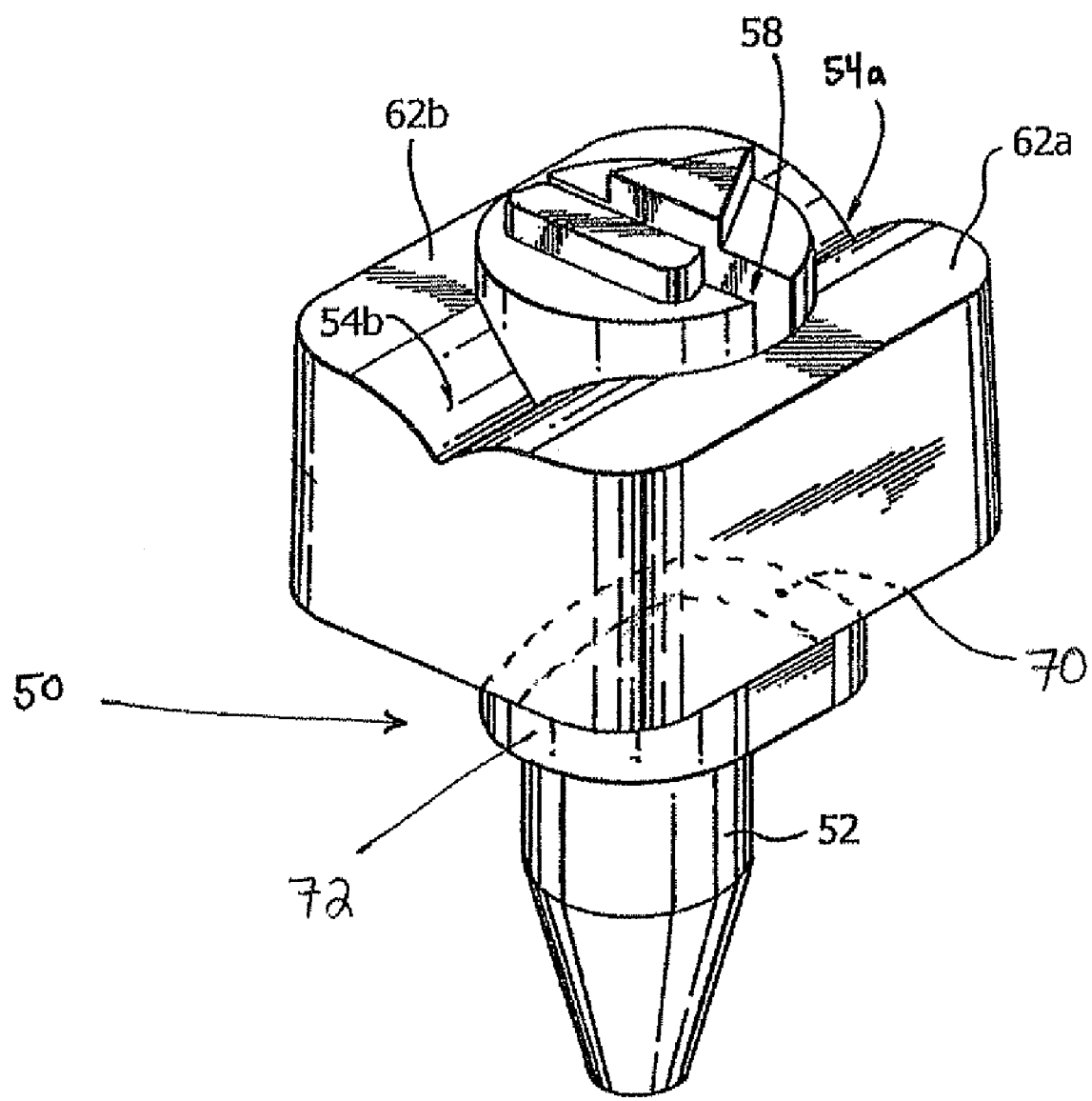

ADJUSTABLE MOTION DETECTION SENSOR WITH CAM

RELATED APPLICATION

This application is a continuation-in-part of U.S. patent application Ser. No. 11/965,054, filed Dec. 27, 2007.

FIELD OF THE INVENTION

This invention relates generally to the field of motion detection sensors, and in particular to a system and method for adjusting the position of a printed circuit board relative to a focusing element.

BACKGROUND OF THE INVENTION

Conventional motion detection sensors are commonly known and mainly used to detect the presence of a person within an area of interest. The motion detection sensor may be monitoring the area for security purposes, and/or used in combination with an illumination device. Motion is detected when an infrared emitting source with one temperature, such as a human body, passes in front of a source with another temperature, such as a wall. The "motion sensing" feature on most lights and/or security systems is a passive system that detects infrared energy. These sensors are known as passive infrared (PIR) detectors or pyroelectric sensors. In some cases, PIR technology can be paired with another model to maximize accuracy and reduce energy usage.

Depending on the application, there are a wide variety of installation locations. Although most motion detection sensors are mounted from an elevated location, the sensor may be placed in other locations, such as a shelf or floor. Changes to the location of the sensor may require changes in the orientation and positioning of the detector within the housing of the motion detection sensor. It may be necessary to adjust the sensor after installation to increase the effectiveness of the sensor. Technicians are often required to adjust the vertical position of the printed circuit board assembly in its enclosure to optimize the relationship between the detector and the focusing element. Currently, position adjustment requires the technician to either loosen a screw and slide the printed circuit board assembly to a specified position and retighten the screw, or remove the printed circuit board assembly from its enclosure to rotate a positioning component to the desired position. However, these steps are undesirable because they are time consuming and may expose the printed circuit board assembly to harm (e.g., dropping, electrostatic discharge damage, and shorting). Furthermore, if a locking screw retention scheme is used, the printed circuit board is more likely to slip out of position, thus compromising motion sensor performance.

Therefore, what is needed in the art is a motion detection sensor in which the position of the printed circuit board can be easily adjusted.

BRIEF SUMMARY OF THE INVENTION

In one exemplary embodiment, the invention is directed to a motion detection sensor comprising a housing having a front opening and an interior cavity, and a focusing element located within the front opening. A detector is coupled to a printed circuit board located within the interior cavity. A cover is coupled to the printed circuit board and disposed within the interior cavity. A cam is operatively coupled with the cover and the printed circuit board for adjusting the position of the printed circuit board such that the detector's position is adjusted relative to the focusing element.

In another embodiment, the cover includes a plurality of protrusions on an inner surface of the cover, and the cam has a plurality of grooves nestable with the plurality of protrusions. The cam has a first contact point and a second contact point for engaging the printed circuit board to adjust the position of the detector relative to the focusing element.

In another embodiment, the cover includes a plurality of grooves on an inner surface of the cover, and the cam has a plurality of protrusions nestable with the plurality of grooves.

In another embodiment, the focusing element comprises at least one lens element for focusing a field of view on the detector. The at least one lens element comprises a Fresnel lens and the detector comprises an infrared detector.

In another embodiment, each of the plurality of grooves is v-shaped and each of the plurality of protrusions is spherically shaped. The plurality of protrusions is integrally molded with the cover.

In another embodiment, the printed circuit board includes a circuit for receiving an output signal of the detector. This circuit comprises an amplifier having an input that receives the output signal of the detector, a comparator having an input electrically connected to an output of the amplifier, a load control having an input electrically connected to an output of the comparator, and a load electrically connected between an output of the load control and an alarm signaling device.

In another embodiment, the cam is positioned through an opening in the cover and through an opening in the printed circuit board. The cam includes a slotted top portion and a lower portion extending into a cam rotation post fixed within the housing. Furthermore, the housing, the cover and cam each comprise a thermoplastic polymer.

In another preferred embodiment, the invention is directed to a method of adjusting a motion detection sensor, the method comprising providing a housing having a front opening and an interior cavity, and a focusing element within the front opening. A detector is also provided, the detector being coupled to a printed circuit board located within the interior cavity. A cover is coupled to the printed circuit board by a cam. The cam is rotated to adjust the position of the printed circuit board such that the detector's position is adjusted relative to the focusing element.

In another embodiment, the cover includes a plurality of protrusions on an inner surface of the cover, and the cam has a plurality of grooves nestable with the plurality of protrusions. Rotating the cam adjusts the alignment of the plurality of grooves relative to the plurality of protrusions.

In another embodiment, the method further comprises positioning the cam through a first opening in the cover and through a second opening in the printed circuit board.

In another embodiment, the cam includes a slotted top portion to assist the rotating of the cam.

In another embodiment of the invention, the plurality of grooves is aligned with the plurality of protrusions when the cam is rotated to a first position and to a second position. In the first and second positions, the plurality of grooves is nestable with the plurality of protrusions.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 3 illustrates an orthogonal view of the cam according to an aspect of the invention.

DETAILED DESCRIPTION OF THE INVENTION

Figure 1:
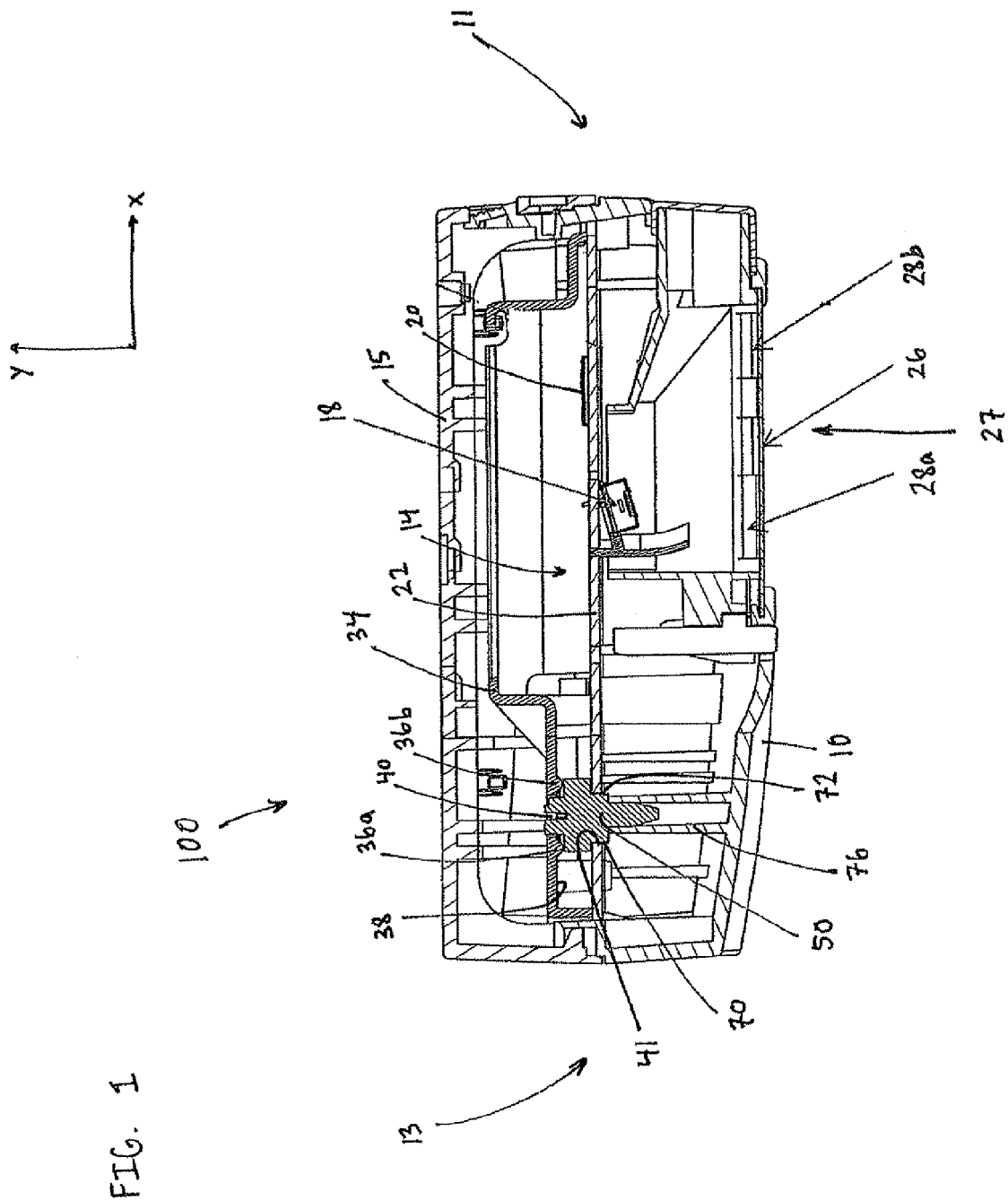
FIG. 1 illustrates a cross-sectional view of the motion detection sensor according to an aspect of the present invention.

The present invention, including a system and method for adjusting the position of a printed circuit board relative to the focusing element, will now be described in greater detail by referring to the drawings that accompany the present application. It is noted that the drawings of the present application are provided for illustrative purposes and are thus not drawn to scale.

Aspects of the invention will first be described with reference to FIG. 1, which depicts a motion detection sensor 100 according to one embodiment of the invention. FIG. 1 shows a cross-sectional view through housing 10, including an interior cavity 14 into which components of the motion detector sensor 100 are mounted. The housing 10 comprises a thermoplastic polymer and includes an outer cover 15 for mounting the motion detection sensor 100 to a wall, ceiling or other suitable location.

A detector 18 is shown connected to a printed circuit board 22 located within the interior cavity 14. In one embodiment, the detector 18 comprises an infrared detector. As is known in the art, motion is detected when an infrared emitting source with one temperature, such as a human body, passes in front of a source with another temperature, such as a wall.

The detector 18 is coupled to a printed circuit board 22 and operates in combination with a focusing element 26 having multiple lens elements 28a, 28b to focus a field of view on the detector 18. It may be necessary to adjust the position of the detector 18 in the x-direction relative to the focusing element 26, thereby changing the field of view of the motion detection sensor 100 to optimize the ability of the sensor to detect humans throughout the protected region. As will be further described below, a cam 50 is provided for adjusting the position of the printed circuit 22 board such that the detector's 18 position is adjusted relative to the focusing element 26.

In one embodiment, the focusing element comprises a Fresnel lens. As is well known in the art, typical Fresnel lenses comprise a series of thin, concentric annular lens elements to reduce the overall thickness of the lens. Although multiple lens elements 28a and 28b are shown in FIG. 1, it can be appreciated that a single lens element is possible within the scope of the invention. Also, in another embodiment, the focusing element may comprise a plurality of mirrored elements for focusing the field of view on the detector 18.

During operation, energy radiated from a source, for example a human, enters front opening 27. The infrared energy entering front opening 27 is focused on detector 18 by the focusing element 26. Detector 18 outputs a signal responsive to the infrared energy radiated from the source. The output signal of the detector 18 is in turn processed by a microprocessor 20 connected with the printed circuit board 22. The microprocessor 20 analyzes the output signal from the detector so as to recognize motion in the detecting area. In an exemplary embodiment, the focusing element 26 located in the front opening 27 is a translucent thermoplastic polymer. However, it can be appreciated that other types of radiation permeable materials may be used to achieve the desired effect.

Referring now to the partial cross-sectional orthogonal view of FIG. 2, a portion of the motion detection sensor 100, including the cam 50, will be described in farther detail. As shown, the motion detection sensor 100 comprises a cover 34 coupled to the printed circuit board 22. The cover includes a pair of protrusions 36a, 36b on an inner surface 38 of the cover 34 facing the printed circuit board 22. In one embodiment, each of the protrusions 36a, 36b are integrally molded with the cover 34. The protrusions 36a, 36b are positioned on opposite sides of an opening 40 in the cover 34. The protrusions 36a, 36b can be a variety of shapes, such as, spherical, rectangular or any other shape that will perform the desired function.

Figure 2:
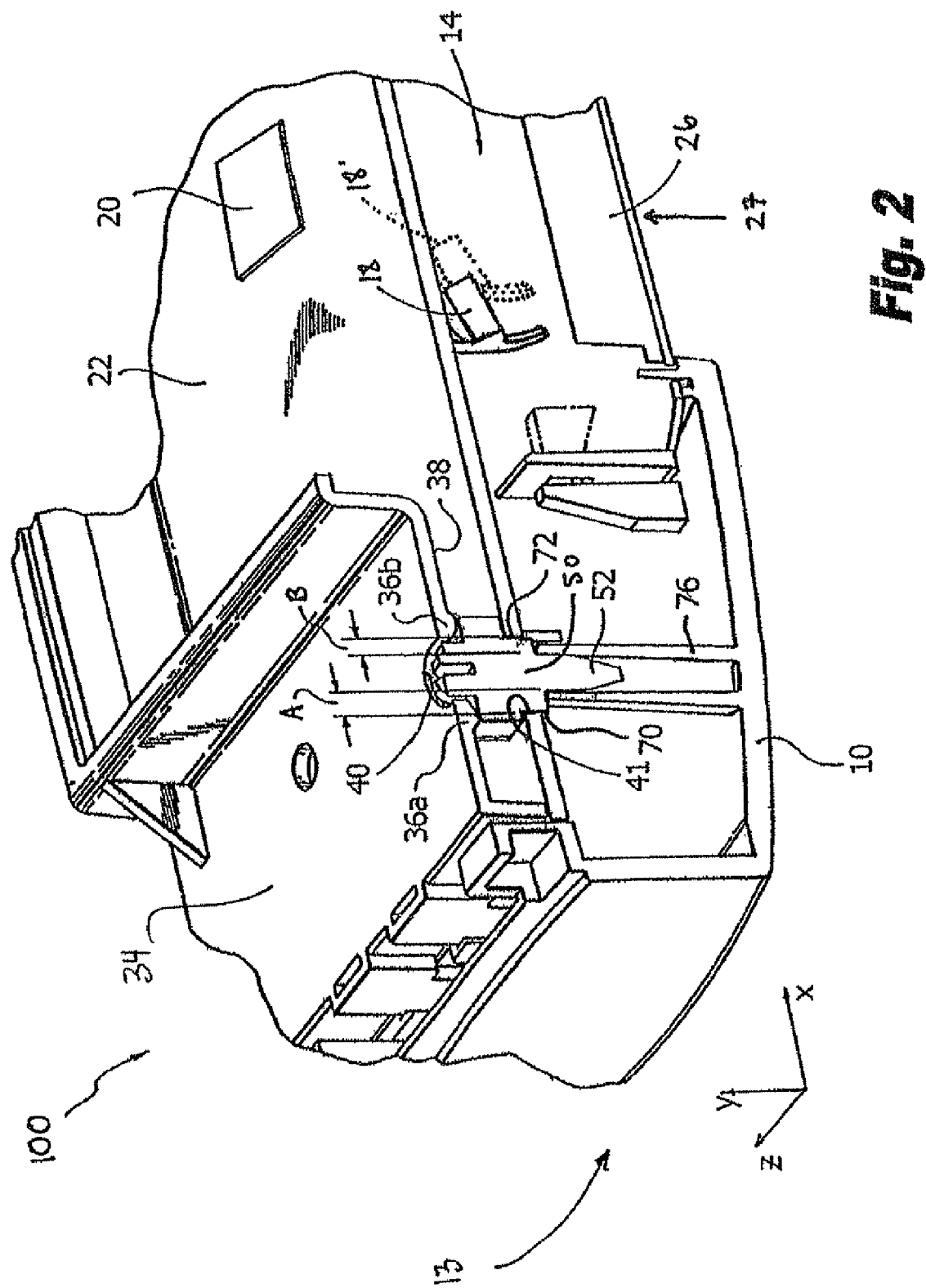
FIG. 2 illustrates a partial cross-sectional orthogonal view of the motion detection sensor according to an aspect of the present invention.

Referring now to FIGS. 1-3, the cam 50 according to an embodiment of the invention will be described in farther detail. The cam 50 is positioned through the opening 40 in the cover 34 and an opening 41 in the printed circuit board 22. The cam 50 comprises a lower portion 52 that extends into a hollow cam rotation post 76 fixed within the housing 10. The cam 50 further comprises a plurality of grooves 54a, 54b that are nestable with the pair of protrusions 36a, 36b for locking the cam 50 in place. The cam 50 includes first and second contact points 70, 72, which engage the printed circuit board 22 during operation. With this configuration, the cam 50 is operatively coupled with the cover 34, the housing 10 and the printed circuit board 22.

In the exemplary embodiment shown in FIG. 3, each of the plurality of grooves 54a and 54b is v-shaped. The v-shape configuration allows the protrusions 36a, 36b and the grooves 54a, 54b to be locked into a nested position. Although two grooves 54a, 54b are shown in the present embodiment, it can be appreciated that any number of grooves are possible for providing multiple adjustment points for the cam. Furthermore, in another embodiment of the invention, the nesting configuration can be reversed, i.e., the cam 50 may include a plurality of protrusions, while the cover includes a plurality of grooves.

The cam 50 comprises a slotted top portion 58 to allow a technician to easily rotate the cam 50 using a screwdriver, for example. The technician can adjust the position of the printed circuit board 22 relative to the focusing element 26 by rotating the cam 50 and adjusting the alignment of the plurality of grooves 54a, 54b relative to the plurality of protrusions 36a, 36b. The grooves 54a, 54b are aligned and nested with the protrusions 36a, 36b, respectively, when the cam 50 is rotated to a first position. As the cam 50 is rotated from the first position to the second position, the protrusions 36a, 36b slide along the slanted surface of each groove 54a, 54b towards flat surfaces 62a, 62b. When the cam is in the second position, groove 54a is nested with protrusion 36b, groove 54b is nested with protrusion 36a, and the position of the detector 18' (as shown in FIG. 2) relative to the focusing element 26 has been adjusted.

In the exemplary embodiment, the cover 34 comprises a thermoplastic polymer that provides tension to maintain the cam 50 securely in the first and second positions. The sensor housing 10 constrains the printed circuit board 22 from moving in either the 'y' or 'z' direction. The first and second contact points 70, 72 of the cam 50 engage the printed circuit board 22 to shift the printed circuit board 22 along the x-axis. Since the first and second contact points 70 and 72 are aligned in the 'x' direction with the cam rotation post 76 that is constrained by housing 10, shock to the housing 10 will place only a shearing load on the cam 50 with no rotational load. When nested together in the first position, the protrusions 36a, 36b and the grooves 54a, 54b will not be under a significant load during shock and vibration conditions.

As best shown in FIG. 2, the lower portion 52 is offset from the center of the cam 50, as the distance 'A' between the lower portion 52 and the first contact point 70 is greater than distance 'B' between the lower portion 52 and the second contact point 72. By rotating the cam 180 degrees from the first position to the second position, the larger 'A' distance rotates towards a second end 11 of the housing. This forces the first contact point 70 of the cam 50 to contact the printed circuit board 22 and shift the printed circuit board 22 along the x-axis towards the second end 1 of the housing 10. The distance between the printed circuit board 22 and a first end 13 of the housing 10 is subsequently increased. The second contact point 72 of the cam 50 contacts the printed circuit board 22 to insure that the shift is not greater than intended. Reversing the cam 50 by 180 degrees causes the first contact point 70 of the cam 50 to come into contact with the printed circuit board 22, thus shifting the printed circuit board 22 along the x-axis and decreasing the distance between the first end 13 of the housing 10 and the printed circuit board 22. Therefore, by rotating the cam 50 the position of the printed circuit board 22, including detector 18, can be adjusted to optimize the alignment of the detector 18 and the focusing element 26.

While the present invention has been described in an illustrative manner, it should be understood that the terminology used is intended to be in a nature of words of description rather than of limitation. Furthermore, while the present invention has been described in terms of illustrative and alternate embodiments, it is to be appreciated that those skilled in the art will readily apply these teachings to other possible variations of the invention.

We claim:

1. A motion detection sensor, comprising:
    a housing having a front opening and an interior cavity;
    a focusing element located within the front opening;
    a detector coupled to a printed circuit board located within the interior cavity;
    a cover coupled to the printed circuit board and disposed within the interior cavity; and
    a cam operatively coupled with the cover and the printed circuit board wherein a rotational axis of the cam extends through an aperture in the printed circuit board to engage opposing sides of the housing with opposing ends of the cam and wherein a varying radius of curvature of the cam extending around the rotational axis perpendicular to the rotational axis engages the circuit board for adjusting the position of the printed circuit board by rotating the cam about the rotational axis such that the detector's position is adjusted relative to the focusing element.

2. The sensor of claim 1, wherein the cover includes a plurality of protrusions on an inner surface of the cover, and wherein the cam has a plurality of grooves nestable with the plurality of protrusions.

3. The sensor of claim 1, wherein the cover includes a plurality of grooves on an inner surface of the cover, and wherein the cam has a plurality of protrusions nestable with the plurality of grooves.

4. The sensor of claim 1, wherein the cam has a first contact point and a second contact point for engaging the printed circuit board to adjust the position of the detector relative to the focusing element.

5. The sensor of claim 1, wherein the focusing element comprises at least one lens element for focusing a field of view on the detector.

6. The sensor of claim 5, wherein the at least one lens element comprises a Fresnel lens.

7. The sensor of claim 1, wherein the detector comprises an infrared detector.

8. The sensor of claim 2, wherein each of the plurality of grooves is v-shaped and each of the plurality of protrusions is spherically shaped.

9. The sensor of claim 8, wherein the plurality of protrusions are integrally molded with the cover.

10. The sensor of claim 1, wherein the printed circuit board comprises a microprocessor for receiving an output signal of the detector.

11. The sensor of claim 1, wherein the housing, the cover and the cam each comprise a thermoplastic polymer.

12. The sensor of claim 1, wherein the cam includes a slotted top portion.

13. The sensor of claim 1, wherein the cam includes a lower portion extending into a cam rotation post fixed within the housing.

14. The sensor of claim 1, wherein the earn is positioned through an opening in the cover and through an opening in the printed circuit board.

15. A method of adjusting a motion detection sensor, comprising:
    providing a housing having a front opening and an interior cavity;
    providing a focusing element within the front opening;
    providing a detector coupled to a printed circuit board located within the interior cavity;
    providing a cover coupled to the printed circuit board by a cam with a cam surface having a varying radius perpendicular to an axis of rotation of the cam; and
    rotating the cam to adjust the position of the printed circuit board such that the detector's position is adjusted relative to the focusing element.

16. The method of claim 15, wherein the cover includes a plurality of protrusions on an inner surface of the cover, and wherein the cam has a plurality of grooves nestable with the plurality of protrusions.

17. The method of claim 15, wherein each of the plurality of grooves is v-shaped and each of the plurality of protrusions is spherically shaped.

18. The method of claim 15, wherein the cam is positioned through an opening in the cover and through an opening in the printed circuit board.

19. The method of claim 16, wherein the plurality of grooves are aligned with the plurality of protrusions when the cam is rotated to a first position and to a second position.

20. The method of claim 15, wherein the cover includes a plurality of grooves on an inner surface of the cover, and wherein the cam has a plurality of protrusions nestable with the plurality of grooves.

* * * * *